(12) United States Patent
Naoe (10) Patent No.: US 6,850,580 B1
(45) Date of Patent: Feb. 1, 2005

(54) BIT SYNCHRONIZING CIRCUIT

(75) Inventor: Hitoshi Naoe, Kitakatsuragi-gun (JP)

(73) Assignee: Sharp Kabushiki Kaisha, Osaka (JP)

( * ) Notice: Subject to any disclaimer, the term of this patent is extended or adjusted under 35 U.S.C. 154(b) by 773 days.

(21) Appl. No.: 09/598,158

(22) Filed: Jun. 21, 2000

(30) Foreign Application Priority Data

Jun. 21, 1999 (JP) .......................................... P11-173669
Jul. 19, 1999 (JP) .......................................... P11-204132

(51) Int. Cl.[7] .............................. H04L 7/00; H04L 7/02
(52) U.S. Cl. ...................... 375/355; 375/360; 375/371
(58) Field of Search ................................ 375/354, 355, 375/371, 372, 376, 340, 359, 360

(56) References Cited

U.S. PATENT DOCUMENTS

| | | | | |
|---|---|---|---|---|
| 4,393,301 A | * | 7/1983 | Svendsen ...................... | 377/56 |
| 5,237,290 A | | 8/1993 | Banu et al. | |
| 5,687,203 A | | 11/1997 | Baba | |
| 5,887,040 A | | 3/1999 | Jung et al. | |
| 5,909,473 A | | 6/1999 | Aoki et al. | |
| 6,081,561 A | * | 6/2000 | Julyan et al. ................ | 375/340 |
| 6,266,799 B1 | * | 7/2001 | Lee et al. ....................... | 716/6 |
| 6,556,640 B1 | * | 4/2003 | Baba ........................... | 375/376 |

FOREIGN PATENT DOCUMENTS

| | | |
|---|---|---|
| JP | 4-189044 | 7/1992 |
| JP | 6-53950 | 2/1994 |
| JP | 7-58731 | 3/1995 |
| JP | 7-95188 | 4/1995 |
| JP | 7-193562 | 7/1995 |
| JP | 8-237117 | 9/1996 |
| JP | 9-36849 | 2/1997 |
| JP | 9-83500 | 3/1997 |
| JP | 9-181709 | 7/1997 |
| JP | 9-181713 | 7/1997 |
| JP | 9-284267 | 10/1997 |
| JP | 10-247903 | 9/1998 |
| JP | 10-271101 | 10/1998 |
| JP | 11-4218 | 1/1999 |
| JP | 11-215110 | 8/1999 |

OTHER PUBLICATIONS

"Phase–Locked Loops–Design, Simulation, and Applications", Roland E. Best, *The Classical Digital PLL (DPLL)*, pp. 156–163, 1997.

"A CMOS Serial Link for Fully Duplexed Data Communication", Kyeongho Lee et al., *IEEE Journal of Solid State Circuits*, vol. 30, No. 4, pp. 353–364, Apr. 1995.

* cited by examiner

*Primary Examiner*—Khai Tran
*Assistant Examiner*—David B. Lugo
(74) *Attorney, Agent, or Firm*—Birch, Stewart, Kolasch & Birch, LLP (57) ABSTRACT

A bit synchronizing circuit used in a reception circuit for serial communication comprises a data sampling circuit for over-sampling inputted data, a change point detecting circuit for detecting a change point of the inputted data based on an output from the data sampling circuit, a change point holding circuit for changing a held value stepwise in the case where the output from the change point detecting circuit is different from the held data, a selected value setting circuit for determining which value of the data sampling circuit is to be selected based on the output of the change point holding circuit and a data selecting circuit for selecting the data from the data sampling circuit based on the output of the selected value setting circuit. It alternatively may comprise a data sampling circuit for over-sampling the bit data, a synchronizing circuit, a change point detecting circuit, and a data selecting circuit.

24 Claims, 10 Drawing Sheets

BIT SYNCHRONIZING CIRCUIT

BACKGROUND OF THE INVENTION

1. Field of the Invention

The present invention relates to a bit synchronizing circuit used in a receiver for high speed serial communication represented by the IEEE 1394, the ATM (asynchronous transfer mode), the space light communication or the like.

2. Description of the Related Art

Along with digitization of an information apparatus, high speed serial communication of digital signals have been widely used for applications ranging from data transfer between LSIs to radio communication or optical fiber commutation.

In such digital communication, it is necessary to send timing information for sampling data correctly in addition to communication data. In many cases, high speed serial communication does not use a separate line for the timing information from the line for the data in order to maintain a low number of communication lines. Instead, the data is made to have a redundancy and coding is used so that the data is securely transferred within a certain cycle of time. Because the transfer of the data itself is the timing information, the data can be correctly recovered, based on the transfer of the data, on the receiver end in the case where the intervals between the transfers are short enough. A circuit to realize this is called a bit synchronizing circuit or a symbol synchronization circuit.

In recent years in high speed serial communication a system called burst mode communication for sending and receiving data intermittently such as a time division system of a dual line type subscriber line system in ISDN (integrated services digital network) and other types of half duplex communication have been developed. In burst mode communication a particular pattern called a preamble is usually transferred before the data to be transferred is transferred in order to establish bit synchronization. Because the data to be transferred cannot be sent during the cycle of the preamble, the shorter the preamble is the more effective the communication is. To shorten the preamble it is important for the technology of the bit synchronizing circuit to establish synchronization at high speed.

Figure 10:
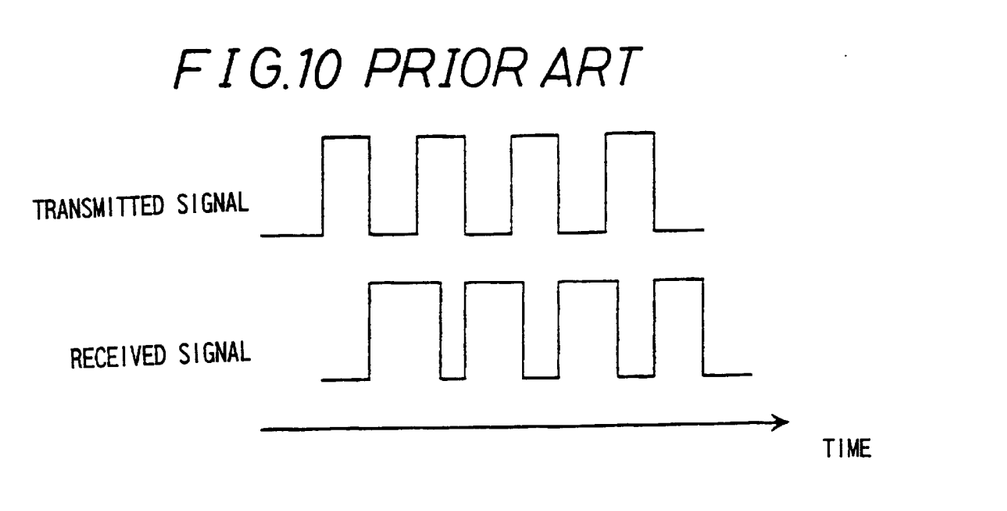
FIG. 10 is a diagram showing transmitted and received signal waveforms when a bias occurs in the pulse width of the signal before the amplifier of the optical receiver is stabilized.

Furthermore, in the case of such a system as to convert signals using an amplifier such as optical fiber communication or radio communication, a bias may arise in the pulse width of the signals until the amplifier is stabilized. A signal waveform of the transmission and reception when that phenomenon occurs is shown in FIG. 10. In FIG. 10, the transmitted signal represents changes in outputs of the transmitter with time. In FIG. 10 is shown a repetitive pattern of 0 and 1 used frequently as a preamble. For example, in the case of optical fiber communication, an LED or laser outputs optical signals based on this transmitted signal.

The received signal as shown in FIG. 10 is an example of a signal which is amplified and processed after a light signal is received by a light receiving element. Depending on the characteristics of the amplifier or the like on the reception end, the cycle where the signal is high becomes long as compared to the transmitted signal while the cycle of low is shortened at the lead of received signal. This tendency becomes smaller while continuing the reception of the signal, which gradually approaches to a waveform of the transmitted signal. To eliminate the influence of the bias of this received signal, it is necessary to further add a preamble. In order to correspond to such a case, a bit synchronizing circuit becomes important to carry out correct synchronization even in the case where the pulse width is biased.

As for prior art to gain such a bit synchronization the following six types are known.

A first technology uses a PLL (phase-locked loops) as disclosed in "Phase-Locked Loops—Design, Simulation, and Applications" Third Edition, Roland E. Best, 1997, McGraw-Hill. In this technology a voltage-controlled oscillator is used to generate a clock on the reception end. The voltage-controlled oscillator is of such a type that outputted clock rate can be changed by changing the operating voltage. The PLL controls the rate of the voltage-controlled oscillator so that the transfer point of the received signal and the transfer point of the clock coincide by using the phase difference between the transfer point of the received signal and the generated clock. In this way, by sampling the received data, with the clock synchronized with the received signal, the signals can be correctly received.

In general, the bit synchronizing circuit which generates a clock synchronized with a received signal on the reception end is generally called a clock recovery system. In the case where the clock recover system is applied for the bit synchronizing circuit, since the received data is synchronized with the clock synchronized with the received signal, an asynchronous FIFO (first in first out) is usually used so as to synchronize the received data with the system clock to the receiver. The received signal is written into the asynchronous FIFO with the clock synchronized with the received signal and by reading out with the system clock of the receiver, it possible to have a synchronization with the system clock of the receiver.

A second technology uses a high speed clock which samples data with a significantly fast clock compared to the bit rate and which determines the sample timing for reception according to the timing of change in sample data value. The UART (universal asynchronous receiver and transmitter) which is a serial controller of a PC uses this method. In the UART a data format called an asynchronousness is used. Usually, in the asynchronousness a start bit is added in the front and a stop bit is added at the end for each eight bits of data. The start bit is always 1 while the stop bit is always 0. The received signal is sampled with a clock of 16 times the bit rate and at the time point when the sample data changes from 0 to 1, that is to say, when the start bit begins, the 4 bit counter is initialized. The sample data when the counter turns to 8 is stored for 8 times so as to confirm that the next stop bit is 0 to be outputted as received data.

A third technology uses switching of two oscillators as described in Japanese Unexamined Patent Publication JP-A 6-53950 (1994). Following the high and low of the received signal, the operation of two oscillators are alternatively started with the operation. The two oscillators start the operation at the surge or the drop of the received signal, respectively, therefore their outputs are synchronized with the received signal. By taking OR of the outputs of the two oscillators, a clock synchronized with the received data is generated. In this technology the asynchronous FIFO described in the first technology is also necessary.

A fourth technology uses a polyphase clock selecting method which selects a polyphase clock, that is, a clock with the closest phase to that of the received data among a plurality of clocks with shifted phases as disclosed in Japanese Unexamined Patent Publication JP-A 7-193562 (1995), Japanese Unexamined Patent Publication JP-A 9-181713 (1997), Japanese Unexamined Patent Publication JP-A 10-247903 (1998). In those publications, a mounting method for selecting a clock with the closest phase to the transfer point of the received signal among a plurality of clocks is disclosed. In this technology the asynchronous FIFO described in the first technology is also necessary.

A fifth technology attempts to accelerate the rate of asynchronousness as disclosed in "A CMOS Serial Link for Fully Duplexed Data Communication," K. Lee, et al., IEEE Journal of Solid-State Circuits, Vol. 30, No. 4, April 1995. In this technology a polyphase clock with a speed of one tenth of the bit rate is used so as to enhance parallelization to implement high speed communication of 500 Mbps. More concretely, 40 clocks of one tenth with equally shifted phases are used. By re-sampling the data sampled by those clocks with a single clock, the information equal to that gained by sampling the duration of a 10 bit time with a rate four times as fast as the bit rate can be gained with intervals of 50 MHz.

By inputting the data to an edge detection circuit, a changing point from 0 to 1 is detected. Actually this technology presumes that to transmit a preamble in the form of 1111100000 in front of the data to be sent at least three times, and during this term, only one part for one time of sampling, that is to say, only at the lead of the start bit changes from 0 to 1. Thereby, it is possible to specify the position of the start bit. Even after the data starts to be transmitted and received after the preambles are finished, the edge of the start bit emerges at almost the same part and, therefore, a circuit is incorporated so that the edge within the data is ignored and the edge of the start bit is trailed.

As described above, the position of the edge of the start bit can be specified while receiving the data, 4 samples each from there are regarded as corresponding to each bit. A value of each bit is determined by a majority decision of the corresponding 4 samples.

A sixth technology uses an over-sampling as disclosed in Japanese Unexamined Patent Publication JP-A 9-36849 (1997). In this technology, the result of sampling the received signal with a faster rate than the bit rate is parallelized at the same rate as the bit rate in order to gain the data, which is then processed. More concretely, changing points are sampled from parallel data to select sample data regarded as reception data from the number and the position of changing points within the parallel data.

However, there exist the following problems with the above described first to sixth technologies.

In the first technology, since it takes time for the synchronization, a long preamble is necessary in front of the data. Additionally because the first technology includes an analog circuit, it is difficult to mass-produce at low cost.

In the second technology, in the case of high speed communication of 100 Mbps to a few Gbps, a clock frequency of several hundreds MHz or more is required, which is not suitable for mounting in an inexpensive CMOS LSI.

In the third technology since the clock is instantaneously synchronized with the edge of the data, the fluctuation of the received signal directly leads to the fluctuation of the clock as it is. In the case where the fluctuation is large, it is necessary to operate the asynchronous FIFO at high speed which is required for the clock recovery system.

According to the fourth technology, from the edge information of the received signal a clock is selected and the received signal is sampled with the selected clock, which needs to be adjusted precisely considering the delay of the circuit selecting the clock. This delay adjustment is accompanied by the same difficulty of the production as that of an analog circuit.

According to the fifth technology only the transition of the STOP/START bit is trailed and the transition is not considered for the data bit part. That is to say, since the transition at the data bit part is not as timing information, there are cases where correction may not be carried out for the fluctuation of the received signal. And since it is determined by majority selection, there are cases where the pulse width of 0 and 1 tends to become biased to either side which can not be coped with.

The fifth technology samples the received signal which is not in a synchronous relationship with a polyphase clock. Usually a D flip-flop is used for the sampling. In order to operate the D flip-flop normally the inputted data need to be held at a constant value for a certain period of time before and after the clock. In the case where the inputted data is not held at a constant value for this period of time, there is the possibility that the D flip-flop may output an unstable value which is neither 0 nor 1. This phenomenon is called metastability. The metastability causes a malfunction of the circuit, therefore, it is desirable to reduce the possibility of occurrence. In the fifth technology this problem is coped with by connecting the sense amplifier in a form or a four stage cascade.

In the sixth technology, the output of the received data is fixed to the clock rate of the receiver, which is inefficient against fluctuation or errors of the bit rate, therefore, it is difficult to maintain the synchronization for a long period of time.

As described above, the conventional methods have defects, and therefore it becomes a problem to be solved to implement bit synchronization which satisfies as many items in the following as possible:

(a) synchronization at high speed,
(b) maintaining the synchronization,
(c) few or no analog parts,
(d) elimination of asynchronous FIFO of high speed,
(e) elimination of clock of high speed,
(f) strong resistance to fluctuation of received signals,
(g) countermeasure against the bias of a particular waveform.

SUMMARY OF THE INVENTION

An object of the invention is to provide a bit synchronizing circuit of high performance.

To solve the above described problems, the invention provides a bit synchronizing circuit comprising a data sampling circuit for over-sampling bit data at a sampling rate faster than a bit rate and outputting in parallel a sampled result at a slower rate than the sampling rate; a change point detecting circuit for detecting rising and falling edges of the bit data based on the data outputted in parallel by the data sampling circuit, a change point holding circuit for holding data from the charge point detecting circuit and changing the data, step by step, in the case where the held data is different from the data from the change point detecting circuit, a selected value setting circuit for determining which piece of data of the data sampling circuit should be selected by the output of the change point holding circuit and a data selecting circuit for selecting the data from the data sampling circuit by the output from the selected value setting circuit.

According to the invention, since the bit synchronizing circuit comprises a change point detecting circuit, a change point holding circuit, a selected value setting circuit and a data selecting circuit as described above, the change point can be slowly changed to maintain the synchronization even in the case where a sudden jitter component or noise enters into the inputted bit data.

In the bit synchronizing circuit of the invention, it is preferable that the bit synchronizing circuit comprises a deviation computing circuit for computing a deviation between information of the held change point and information of the change point detected by the change point detecting circuit.

Furthermore, in the bit synchronizing circuit of the invention, it is preferable that the change point holding circuit is configured so that held information is changed step by step from the held change point to the vicinity of information of the change point detected by the change point detecting circuit based on the computing result of the deviation computing circuit.

According to the invention, since the deviation computing circuit is provided, holding the change point of the original bit data can be soon achieved.

Furthermore, in the bit synchronizing circuit of the invention, it is preferable that the bit synchronizing circuit comprises a counter for counting based on the output from the deviation computing circuit and a comparison circuit for comparing a counter value with a predetermined upper limit value and a predetermined lower limit value.

Further, in the bit synchronizing circuit of the invention, it is preferable that the change point holding circuit changes held information based on a comparison result of the comparison circuit when the counter value is either the predetermined upper limit value or more, or the predetermined lower limit value or less.

According to the invention, the same effect as that of inserting a filter for the fluctuation of the change point can be gained so that, even in the case where metastability occurs at the data sampling circuit which over-samples the bit data or a fluctuation of the bit data occurs, they could be averaged so as to reduce to the malfunctions caused by them.

Furthermore, in the bit synchronizing circuit of the invention, it is preferable that the predetermined upper and lower limit values of the comparison circuit are variable.

According to the invention, the filter effect can be changed so that both functions of a circuit, which can synchronize quickly, and a circuit, which can synchronize stably, can be implemented.

Furthermore, in the bit synchronizing circuit of the invention, it is preferable that the change point holding circuit holds the change point information of the change point detecting circuit without change in the case where a signal is inputted after no signal condition continues for more than a certain period of time.

According to the bit synchronizing circuit of the invention, it is possible to synchronize instantly when inputting of signal is started.

Furthermore, the invention provides a bit synchronizing circuit comprising a data sampling circuit for over-sampling bit data at a sampling rate faster than a bit rate and for outputting in parallel sampled data at a slower rate compared to sampling rate, a change point detecting circuit for detecting rising and falling edges of bit data outputted in parallel from the data sampling circuit, a selected value setting circuit for determining which piece of data of the data sampling circuit should be selected by the output of the change point detecting circuit, a synchronizing circuit for synchronizing the data from the data sampling circuit and a data selecting circuit for selecting data outputted from the synchronizing circuit by data outputted from the selected value setting circuit.

Furthermore, in the bit synchronizing circuit of the invention, it is preferable that the bit synchronizing circuit comprises a synchronizing circuit for synchronizing the output from the data sampling circuit which has been over-sampled to be outputted to the data selecting circuit.

According to the invention, the occurrence of metastability at the data selecting circuit can be restricted by synchronizing the data of the data sampling circuit.

Furthermore, in the bit synchronizing circuit of the invention, it is preferable that the synchronizing circuit comprises a change point delay circuit for delaying the outputted value from the change point detecting circuit or change point holding circuit by the time generated when synchronizing the output from the data sampling circuit which has been over-sampled.

Furthermore, in the bit synchronizing circuit of the invention, it is preferable that the bit synchronizing circuit comprises a selected value delay circuit for delaying the outputted value from the selected value setting circuit, by the time generated when the output from the data sampling circuit which has been over-sampled is synchronized.

According to the invention, the selected data inputted to the data selecting circuit has the over-sampled value, therefore, the gap with the time for synchronizing the over-sampled data can be solved.

Furthermore, in the bit synchronizing circuit of the invention, it is preferable that the bit synchronizing circuit comprises a synchronous FIFO with the output from the data selecting circuit as an input.

Furthermore, in the bit synchronizing circuit of the invention, it is preferable that the bit synchronizing circuit comprises a synchronous FIFO writing circuit compensating the excess or shortage of data to be written into the synchronous FIFO in the case when a clock of the bit data and a clock of the receiving end are shifted.

According to the invention, with the synchronous FIFO, the received data can be outputted with the clock on the receiving end even in the case when the clock of the bit data and the clock on the receiving end are different, therefore, the configuration does not need an asynchronous FIFO.

Furthermore, in the bit synchronizing circuit of the invention, it is preferable that a polyphase clock is used in the same way as that of the fifth method of the prior art in the case where the over-sampling circuit is desired to be operated with a low speed clock. More concretely, the over-sampling circuit has a configuration for over-sampling the bit data by a plurality of clocks of which phases are shifted with almost equal intervals and of which speed is the same as or slower than the bit rate.

According to the invention it becomes possible to over-sample with a low speed clock.

As described above, according to the invention, since the bit synchronizing circuit comprises a data sampling circuit, a change point detecting circuit, a change point holding circuit, a selected value setting circuit and a data selecting circuit, it is possible to realize a bit synchronizing circuit which does not need a clock of high speed, synchronizes at high speed, can maintain the synchronization, is strongly resistant to the fluctuations of signals and can cope with a biased waveform.

According to the invention, since the bit synchronizing circuit comprises a data sampling circuit, a synchronizing circuit, a data selecting circuit, a change point output circuit, a synchronous FIFO writing circuit and a synchronous FIFO, it is possible to realize a bit synchronizing circuit which does not require an asynchronous FIFO.

To achieve the above described purpose, the invention provides a bit synchronizing circuit comprising a data sampling circuit for over-sampling bit data which is received data with a sampling rate of which the speed is the same as, or greater than, the bit rate, and for outputting in parallel a plurality of pieces of sampled data as a result of the over-sampling with a rate which is slower than the sampling rate, a synchronizing circuit for synchronizing a plurality of pieces of sampled data outputted in parallel from the data sampling circuit by gradually shifting the timing using multiple stages of D flip-flops and a change point detecting circuit for detecting where in the sampled data, which is over-sampled, the change point exists based on the data outputted from the synchronizing circuit.

According to the invention, the bit data, which is over-sampled, can be used as sample data synchronized by a clock which is the same as or slower than the bit rate, and based on the sampled data the change point can be detected in the same clock.

In the bit synchronizing circuit of the invention, it is preferable that a polyphase clock is utilized like the fifth technology of the prior art in the case where the data sampling circuit, which over-samples, is desired to be operate with a low speed clock.

More concretely, the bit synchronizing circuit is comprised so that the data sampling circuit over-samples with a plurality of clocks whose phases are shifted by a nearly uniform interval with a speed the same as or slower than the bit rate.

According to the invention, it becomes possible to over-sample with a low speed clock.

Furthermore, in the bit synchronizing circuit of the invention, it is preferable that the over-sampled time is checked from an older one to a newer one in sequence so as to provide a method for detecting the changing part based on the synchronized sampled data as a method of change point detecting in the change point detecting circuit.

According to the invention, the change point of sampled data which is over-sampled can be easily detected from a signal operating with the same clock.

Furthermore, in the bit synchronizing circuit of the invention, it is preferable that a method for detecting a change point is used in which the synchronized sampled data, which is gained by over-sampling the bit data for one cycle of the bit rate and equivalent sampled data which is gained by delaying the most recently sampled synchronized sampled data by one cycle of the bit rate are used.

According to the invention, it becomes possible to detect the change point of one cycle of the bit rate without fail.

Furthermore, in the bit synchronizing circuit of the invention, it is preferable that a method for detecting a change point is used in which another signal outputted in parallel is checked in the case where a time change existed for each parallel output of the synchronizing circuit.

According to the invention, a change point of the sampled data which is over-sampled can be easily detected from a signal operating with the same clock.

Furthermore, in the bit synchronizing circuit of the invention, it is preferable that the output of the change point detecting circuit is changed only when the change point is detected.

According to the invention, the calculated data can be prevented from being outputted when the bit data has no change.

Furthermore, in the bit synchronizing circuit of the invention, it is preferable that the bit synchronizing circuit comprises a data selecting circuit for selecting sampled data outputted from the output of the synchronizing circuit.

In the bit synchronizing circuit of the invention, it is preferable that the data selecting circuit selects sampled data from the synchronizing circuit which is shifted by approximately half of the bit rate from the change point detected by the change point detecting circuit.

According to the invention, the part which is most distant from the change point of the bit data can be selected so that the precise bit data can be recovered.

Furthermore, in the bit synchronizing circuit of the invention, it is preferable that the bit synchronizing circuit comprises a synchronous FIFO to which the output from the data selecting circuit is inputted.

Moreover, in the bit synchronizing circuit of the invention, it is preferable that the bit synchronizing circuit comprises a synchronous FIFO writing circuit provided with means for adjusting the bit data in the case where the clock of the bit synchronizing circuit and the clock of the bit data are shifted.

According to the invention, the bit data which is the received data with the clock of the bit synchronizing circuit can be outputted with a configuration which is provided with a synchronous FIFO and which needs no asynchronous FIFO even in the case where the clock in the bit synchronizing circuit and the clock in the bit data cause a shift (for example, in the case of unevenness of the system clock where 100 MHz and 100.01 MHz occurs).

As described above, according to the invention, it becomes possible to implement a bit synchronizing circuit, which does not require a high speed clock, can synchronize at high speed, can maintain the synchronization, is strongly resistant to the fluctuation of the received signal, can cope with a biased waveform and needs no asynchronous FIFO because of a configuration which is provided with a data sampling circuit, a synchronizing circuit, a change point detecting circuit, a data selecting circuit, a synchronous FIFO writing circuit and a synchronous FIFO as described above.

BRIEF DESCRIPTION OF THE DRAWINGS

Other and further objects, features, and advantages of the invention will be more explicit from the following detailed description taken with reference to the drawings wherein.

DETAILED DESCRIPTION OF THE PREFERRED EMBODIMENTS

Now referring to the drawings, preferred embodiments of the invention are described below.

(First Mode)

Figure 1:
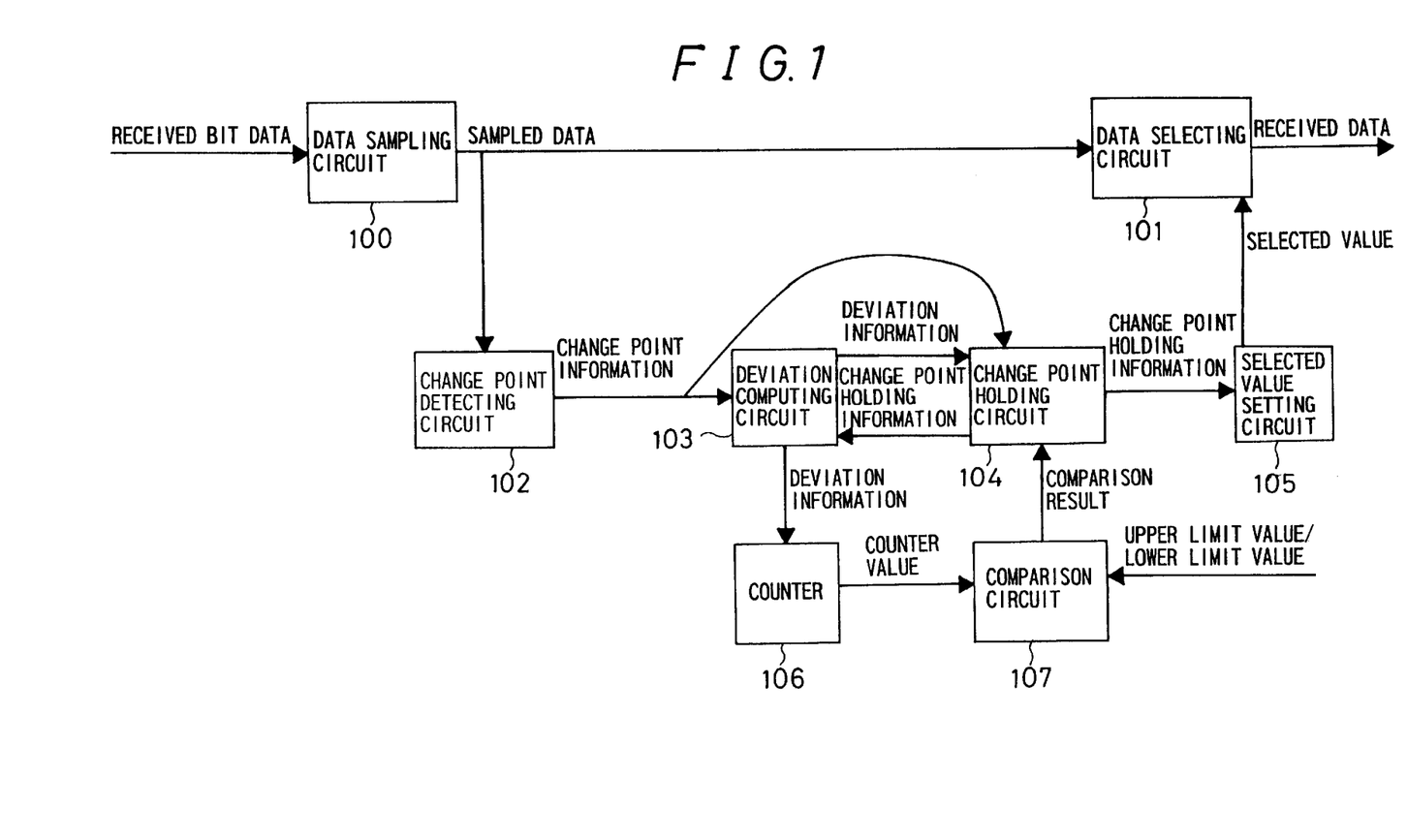
FIG. 1 is a block diagram showing a schematic configuration of a bit synchronizing circuit of the first embodiment according to the invention.

A schematic configuration of a bit synchronizing circuit of the first mode according to the invention is shown in a block diagram of FIG. 1.

As shown in FIG. 1, the bit synchronizing circuit of the present mode comprises a data sampling circuit 100 for performing over-sampling by a clock with the sampling rate of which the speed is the same as, or faster than, the bit rate or by a plurality of clocks of which the phases are shifted with almost equal intervals and of which the speed is the same as, or slower than, the bit rate, a change point detecting circuit 102 for detecting a change point where the bit data is changing by a certain method based on the output data from the data sampling circuit 100, a change point holding circuit 104 for changing the held value step-by-step in the case where the output from change point detecting circuit 102 is different from the held data, a selected value setting circuit 105 for determining which value of the data sampling circuit 100 is selected based on the output of the change point holding circuit 104 and a data selecting circuit 101 for selecting data from the data sampling circuit 100 based on the output of the selected value setting circuit 105.

Furthermore, the bit synchronizing circuit of the mode comprises a deviation computing circuit 103 for calculating the different between the value of the change point holding circuit 104 and the value of the change point detecting circuit 102 from the output of the change point detecting circuit 102 and the output of the change point holding circuit 104, a counter 106 for counting based of the output from the deviation computing circuit 103 and a comparison circuit 107 for comparing the value of the counter 106 with the preset upper and lower limit values.

That is to say the bit synchronizing circuit of the mode comprises a data sampling circuit 100 for over-sampling the bit data, a change point detecting circuit 101 for detecting the change point of the bit data, a change point holding circuit 104 for holding the change point, a selected value setting circuit 105 for determining a selected value of which value of the data sampling circuit 100 is to be selected based on the output from the change point holding circuit 104, a data selecting circuit 101 for selecting data from the data sampling circuit 100 from the output of the selected value setting circuit 105, a deviation computing circuit 103 for calculating the difference between the values of the change point detecting circuit 102 and the change point holding circuit 104, a counter 106 for counting up or counting down by the output of the change point detecting circuit and a comparison circuit 107 for comparing the output of the counter 106 with the upper limit value and the lower limit value to output the comparison result.

And the change point holding circuit 104 changes the held data step-by-step in the case where the detected change point and the held change point are different. This circuit allows an extreme reduction of the selection of the error data in the case where the bit data has a lot of jitter components or noise is found in the inputted signal.

Though the data sampling circuit 100, the change point detecting circuit 102, the change point holding circuit 104, the selected value setting circuit 105 and the data selecting circuit 101 operate as a bit synchronizing circuit, it becomes possible to be quickly set to the value of the change point detecting circuit by comparing the data of the change point held in this circuit at present and the data of the detected change point and by having a deviation computing circuit 103 for detecting in which direction the shift occurs.

A counter 106 is provided so that, based on the data of the deviation computing circuit 103, in the case where the data of the change point detecting circuit 102 is in the front of the data of the change point holding circuit 104 the numeric value is counted up and in the case where the data of the change point detecting circuit 102 is at the back of the data of the change point detecting circuit 104 the numeric value is counted down. A comparison circuit 107 is provided for comparing those values of the counter 106 and the set upper and lower limit values so that in the case where the counter 106 is larger than the upper limit value the numeric value of the change point holding circuit 104 is changed to select the previous data and in the case where the counter 106 is smaller than the lower limit value the numeric value of the change point holding circuit 104 is changed to select the back data so as to reset the value of the counter 106 to the initial value.

By doing thus, when there are many jitter components or the like in the inputted bit data which create instability or when the data sampling circuit 100 or the like generated metastability, those numeric values are averaged to reduce the probability of selecting error data.

And by making the upper limit value inputted to this comparison circuit 107 smaller and the lower limit value larger the bit synchronizing circuit becomes synchronized more quickly and by making the upper limit value larger and the lower limit value smaller the bit synchronizing circuit becomes such that synchronization failure is reduced.

In this way, since the bit synchronizing circuit operates as another bit synchronizing circuit only by changing the upper and lower limit values in the case where the upper and the lower limit values are changeable, the bit synchronizing circuit can be synchronized quickly and can maintain the synchronization by setting the upper limit value lower and the lower limit value higher in the preamble and by setting the upper limit value higher and the lower limit value lower after the start flag is detected.

To synchronize more quickly, in the case where a no-signal condition for more than a certain period of time converts to a with-signal condition, the output from the change point detecting circuit 102 is inputted as it is to the change point holding circuit 104 to gain the initial value of the change point holding circuit 104 and by having that value not to be step-by-step but to be direct and instant synchronization can be achieved.

As described above, according to the bit synchronizing circuit of the mode, the value of the change point holding circuit 104 can be set to the value of the change point detecting circuit 102 quickly because of the provided deviation computing circuit 103.

Furthermore, as described above, because the counter 106 is provided, the same effect is gained as the inserted filter when the data from the selected data sampling part is changed and in the case where metastability to the data of the data sampling part occurs a fluctuation occurs to the bit data, those can be averaged so that malfunctions due to those can be dramatically reduced. Further, in the case where the upper limit and the lower limit values of the comparison circuit 107 are changeable, the filter effect can be changed so that both sides of a circuit which can synchronize quickly and a circuit which can synchronize stably can be implemented.

Furthermore, when a signal is inputted after a no-signal condition has lasted for more than a certain period of time in the case of a configuration where the value of the change point detecting circuit 102 is directly inputted to the change point holding circuit 104, synchronization can be gained instantaneously when a signal is started to be inputted.

(Second Mode)

Figure 2:
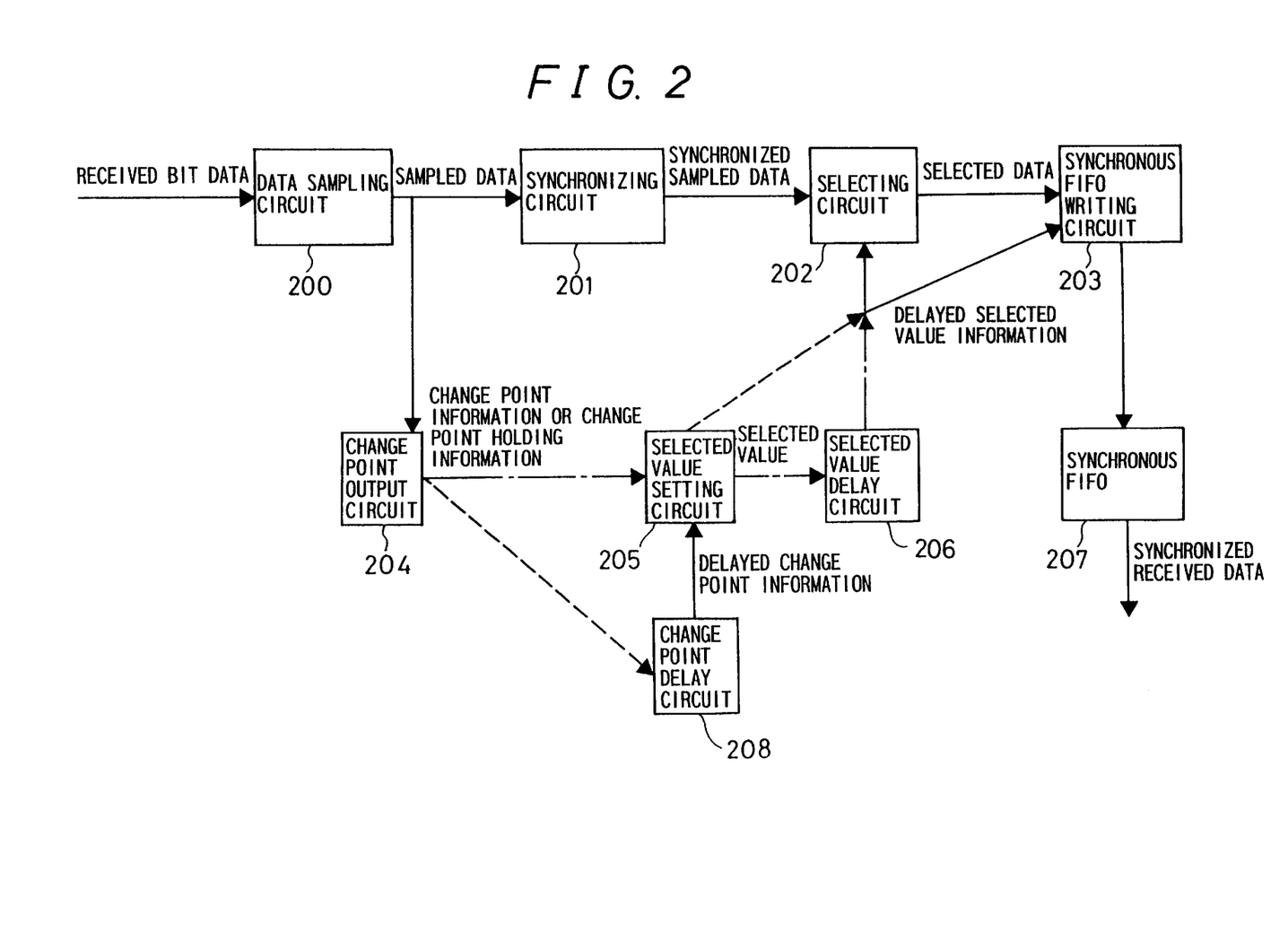
FIG. 2 is a block diagram showing a schematic configuration of a bit synchronizing circuit of the second embodiment according to the invention.

A schematic configuration of a bit synchronizing circuit of the second mode is shown in a block diagram of FIG. 2.

As shown in FIG. 2, a bit synchronizing circuit of the present mode comprises a data sampling circuit 200 for performing over-sampling by a clock with the sampling rate of which the speed is the same as, or faster than, the bit rate or by a plurality of clocks of which the phases are shifted with almost equal intervals and of which the speed is the same as, or slower than, the bit rate, a change point detecting circuit for detecting a change point where the bit data is changing by a certain method based on the output data from the data sampling circuit 200 or a change point holding circuit such as in the bit synchronizing circuit 204 of the first mode as described above (hereinafter referred to as "a change point output circuit"); a synchronizing circuit 201 for synchronizing the output of the data sampling circuit 200 with a clock of which the speed is the same as, or slower than, the same bit rate, a change point delay circuit 208 for delaying the output of the change point output circuit 204 for the time that it takes the synchronizing circuit 201 to synchronize the output of the data sampling circuit 200, a selected value setting circuit 205 for determining which value of the synchronizing circuit 201 is to be selected based on the output of the change point output circuit 204 or the output of the change point delay circuit 208, a selected value delay circuit 206 for delaying the output of the selected value setting circuit 205 for the time that it takes for the synchronizing circuit 201 to synchronize the output of the data sampling circuit 200, a data selecting circuit 202 for selecting from the synchronizing circuit 201 based on the output of either the selected value setting circuit 205 or the selected value delay circuit 206, a synchronous FIFO 207 for inputting or outputting the data with the same clock as that of the receiving circuit and a synchronous FIFO writing circuit 203 having a function of adjusting the data from the data selecting circuit 202 so as to be written into the synchronous FIFO 207. with respect to over-sampling using the same clock as the bit rate is described, the invention is not limited to this.

Figure 3:
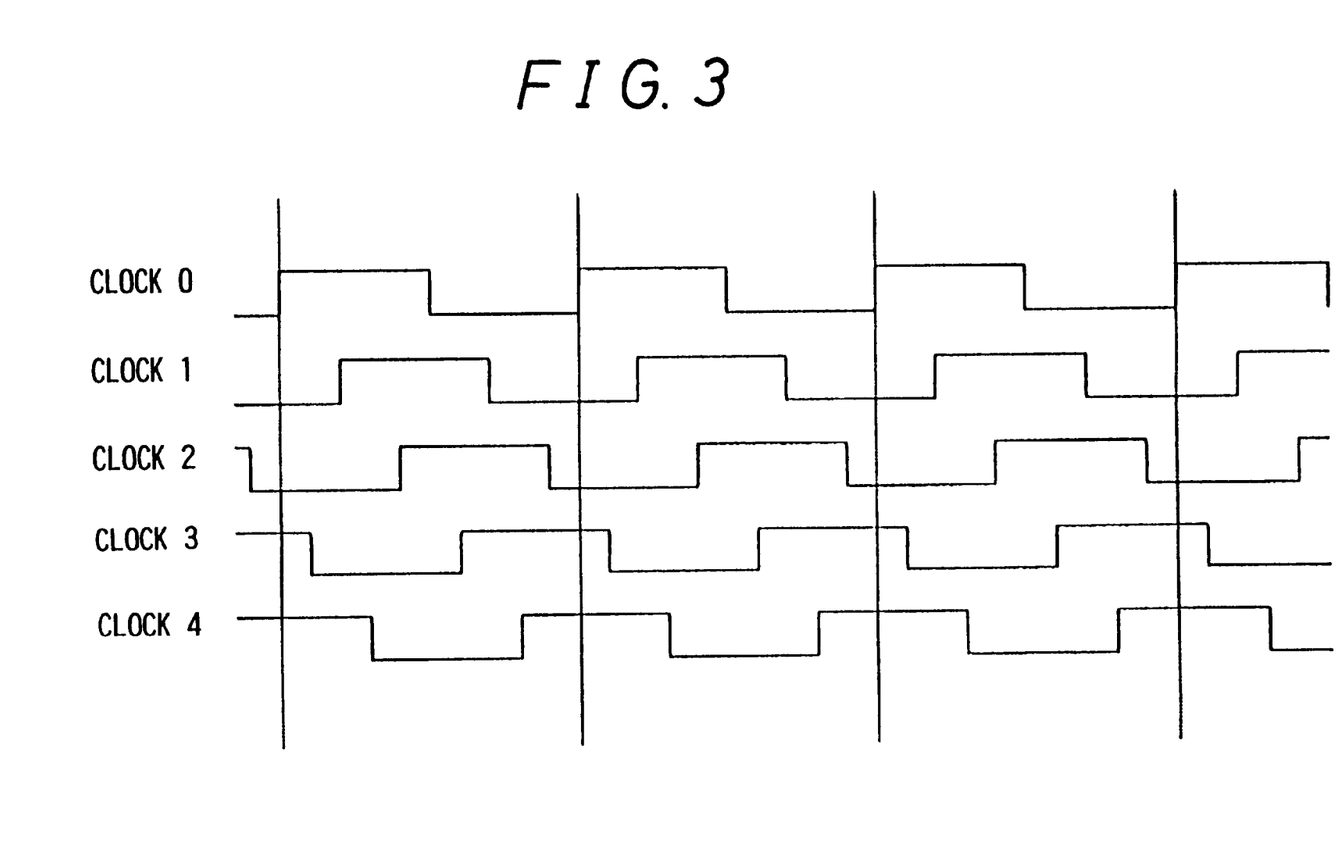
FIG. 3 is a diagram showing a clock waveform of a polyphase clock inputted to the bit synchronizing circuit shown in FIG. 2.
Figure 4:
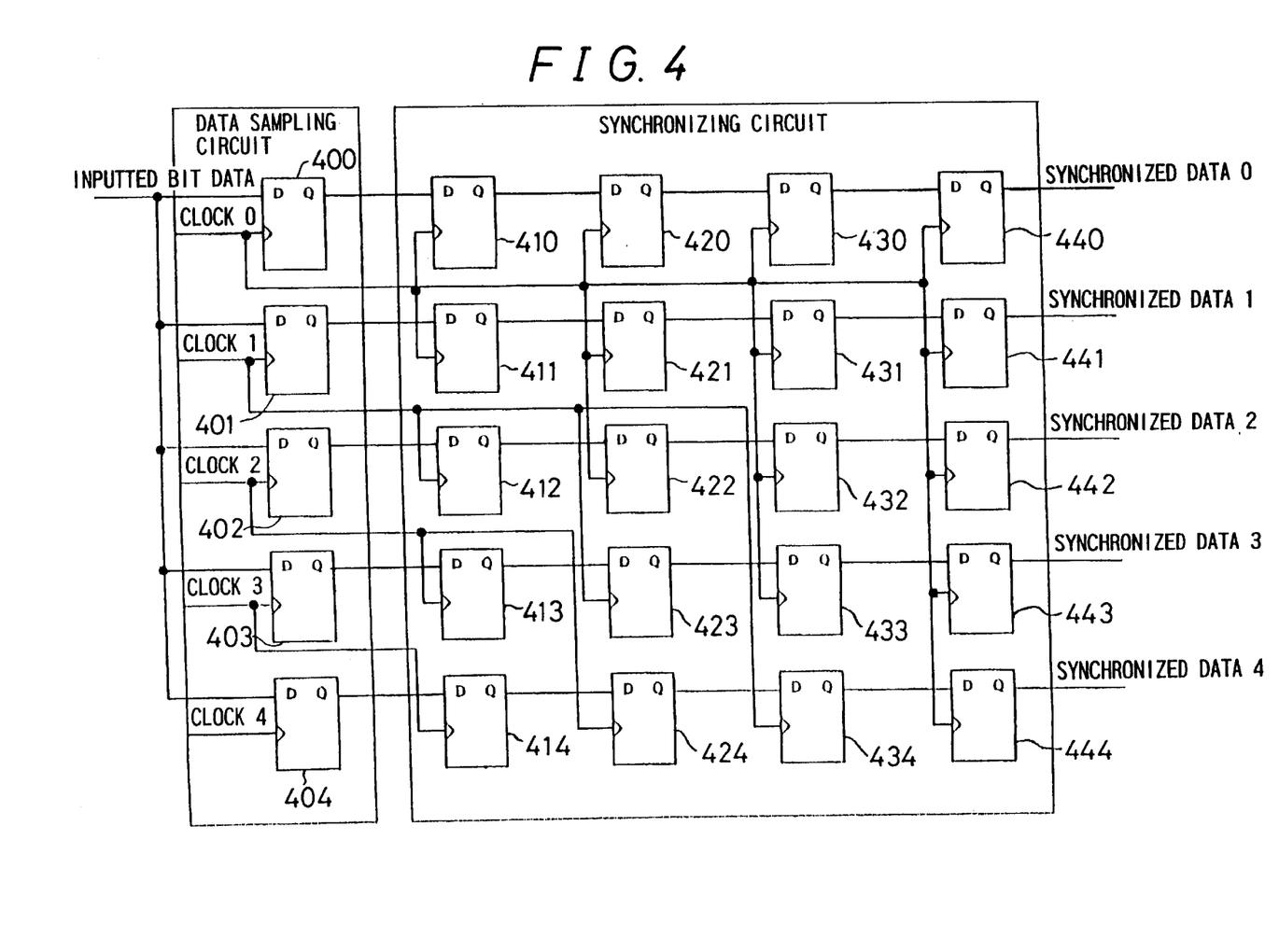
FIG. 4 is a block diagram showing a schematic configuration of a synchronizing circuit in the bit synchronizing circuit shown in FIG. 2.

In a bit synchronizing circuit of the mode which performs the operation by such a five phase clock from clock 0 to clock 4 as shown in FIG. 3, the data sampling circuit is shown as D flip-flops 400 to 404 in FIG. 4.

Those sampled pieces of data are synchronized by the D flip-flops 410 to 444. More concretely, for example, the D flip-flop 404 is operated by the clock 4 and the D flip-flop 414 which inputs the output of the D flip-flop 404 is operated by the clock 3 and so forth so that all of the D flip-flops 440-444 which are in the final stage are operated by clock 0 by gradually changing the clocks. In this embodiment, although the clocks are gradually changed, in the case where an allowance is added to the setup time of the D flip-flops, D flip-flops at a midpoint (e.g., one or two of sets of D flip-flops 410 to 414; 420 to 424; and 430 to 434) may be eliminated, if necessary, to carry out faster synchronization.

By synchronizing in this way, all pieces of the sampled data are changed by the same clock, therefore, the operation of selecting those pieces of sampled data to be inputted to the data selecting circuit 202 becomes easy to perform and the metastability can be prevented from occurring.

Since the data of the selected value setting circuit 205 based on the change point information which is delayed by the change point delay circuit 208 to which the data from the change point output circuit 204 is inputted or the data of the selected value delay circuit 206 to which the value outputted through the selected value setting circuit 205 from the change point detecting circuit 204 is inputted is the data when the bit data is sampled, the data selecting circuit 202 does not select data erroneous in timing.

Figure 5:
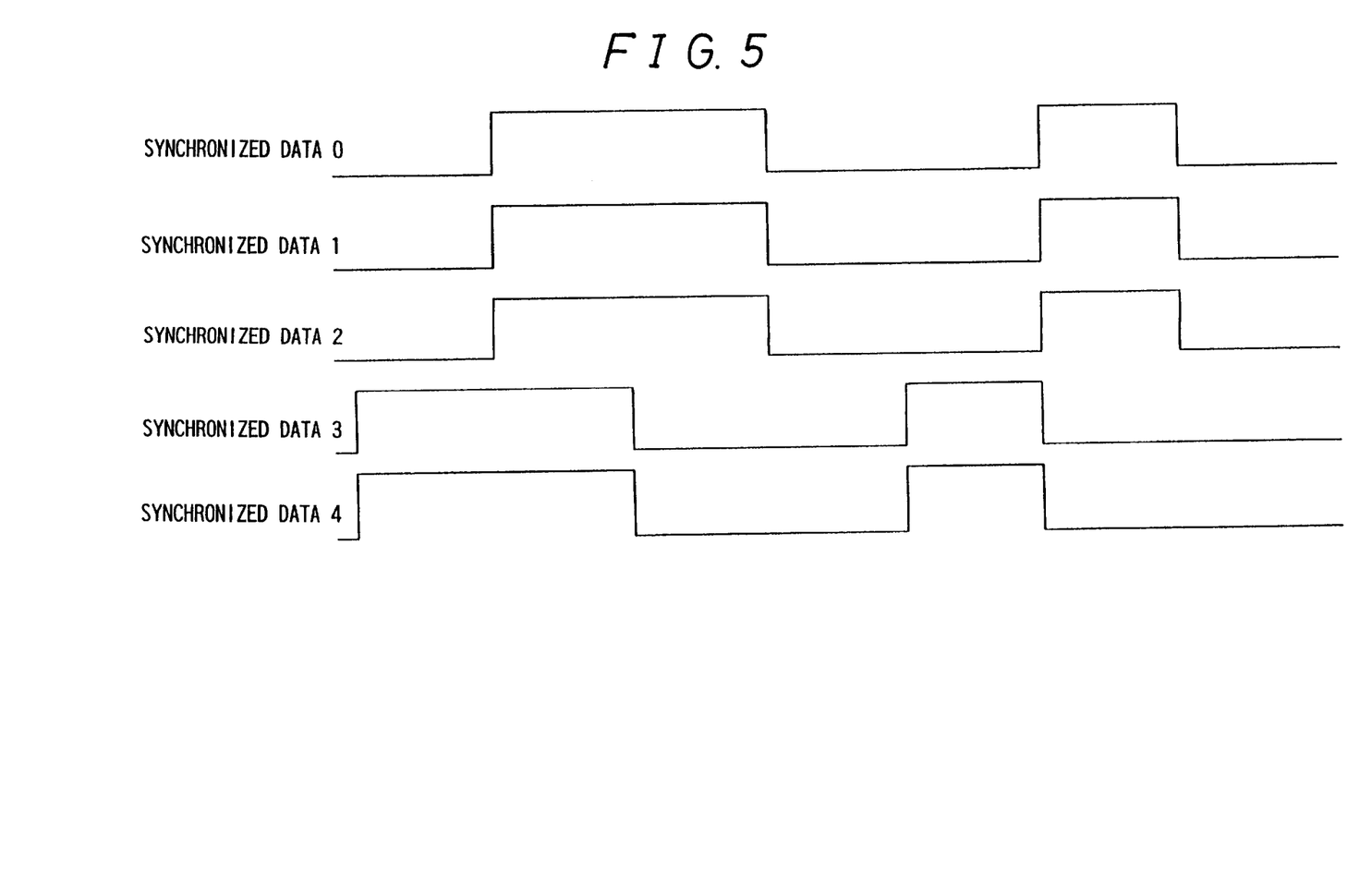
FIG. 5 is a diagram showing a waveform of each signal outputted from a synchronizing circuit in the bit synchronizing circuit shown in FIG. 2.

Such synchronization causes the data inputted to the D flip-flop 404, for example, to proceed by approximately one cycle of the clock in the case when emitted from the D flip-flop 444. In this way, in the synchronizing circuit, there exist data gained by advancing the same data as shown in FIG. 5. And those pieces of data are selected by the data selector 202 to be inputted into the synchronous FIFO, then a surplus or a shortage occurs in the data.

Therefore, in the bit synchronizing circuit of the mode, in the case where the output of the D flip-flop 440 is selected to the synchronous FIFO writing circuit 203 for writing the data to be inputted to the synchronous FIFO from the condition that, for example, the output of the D flip-flop 444 is selected, the data is accelerated to be outputted and in the case where the output of the D flip-flop 444 is selected from the condition where the output of the D flip-flop 440 is selected, the output of D flip-flop 444 is delayed being outputted, and by having a function of inputting the data of D flip-flop 440 as the data of the missed time, the data without any data surplus or data shortage are inputted to the synchronous FIFO. And, in the case of the synchronous FIFO, without having a read-out request, the output of this synchronous FIFO writing circuit 203 becomes synchronized received data without change.

As described above, according to the bit synchronizing circuit of the present mode, no asynchronous FIFO becomes necessary for a bit synchronizing circuit so as to be able to implement a simple circuit.

(Third Mode)

Figure 6:
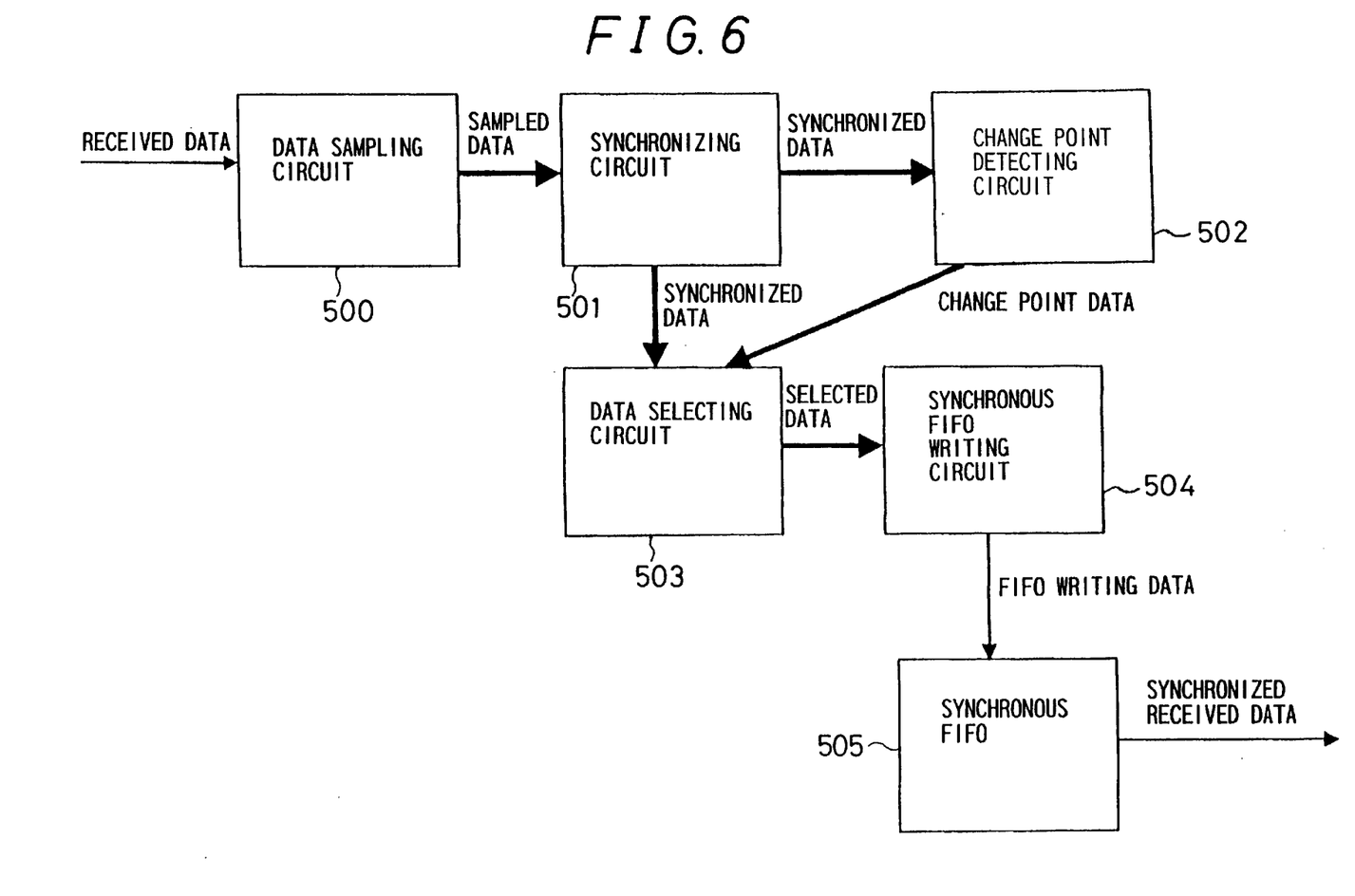
FIG. 6 is a block diagram showing a schematic configuration of a bit synchronizing circuit of the third embodiment according to the invention.

A schematic configuration of a bit synchronizing circuit of the third mode according to the invention is shown in a block diagram of FIG. 6.

As shown in rig. 6, a bit synchronizing circuit of the mode comprises a data sampling circuit 500 for performing over-sampling on the bit data which is the received data by the clock of which the speed is the same as, or faster than, the bit rate or by a plurality of clocks of which the phases are shifted with almost equal intervals and of which the speed is the same as, or slower than, the bit rate, and which has the sample rate of which the speed is more than that of the bit rate, a synchronizing circuit 501 for synchronizing the output of the data sampling circuit 500 with the clock of which the speed is the same as, or slower than, the same bit rate, a change point detecting circuit 502 for detecting which sampled data is changed by the bit data based on the output of the synchronizing circuit 501, a data selecting circuit 503 for selecting desired sample data among the output of the synchronizing circuit 501 based on the output of the change point detecting circuit 502, a synchronizing type FIFO 505 for inputting or outputting the received data synchronized by the same clock as the reception circuit and a synchronous FIFO writing circuit 504 having the function of adjusting the data due to a shift of the clock from the data selecting circuit 503 so as to be written into the synchronous FIFO 505.

In the above description, the bit rate is the minimum change unit of the bit data, which is an interval between the neighboring broken lines in FIG. 9 as described in the following in the mode. And the sample rate is a speed for over-sampling, which is an interval gained by dividing the bit rate by a five phase clock in the mode.

Though in this mode, the case where, as for over-sampling using the clock one cycle of which is of the same length as the bit rate, a five phase clock is used and the rising of the bit data is detected for the detection of the change point of the bit data is described, this invention is not limited to this.

Figure 7:
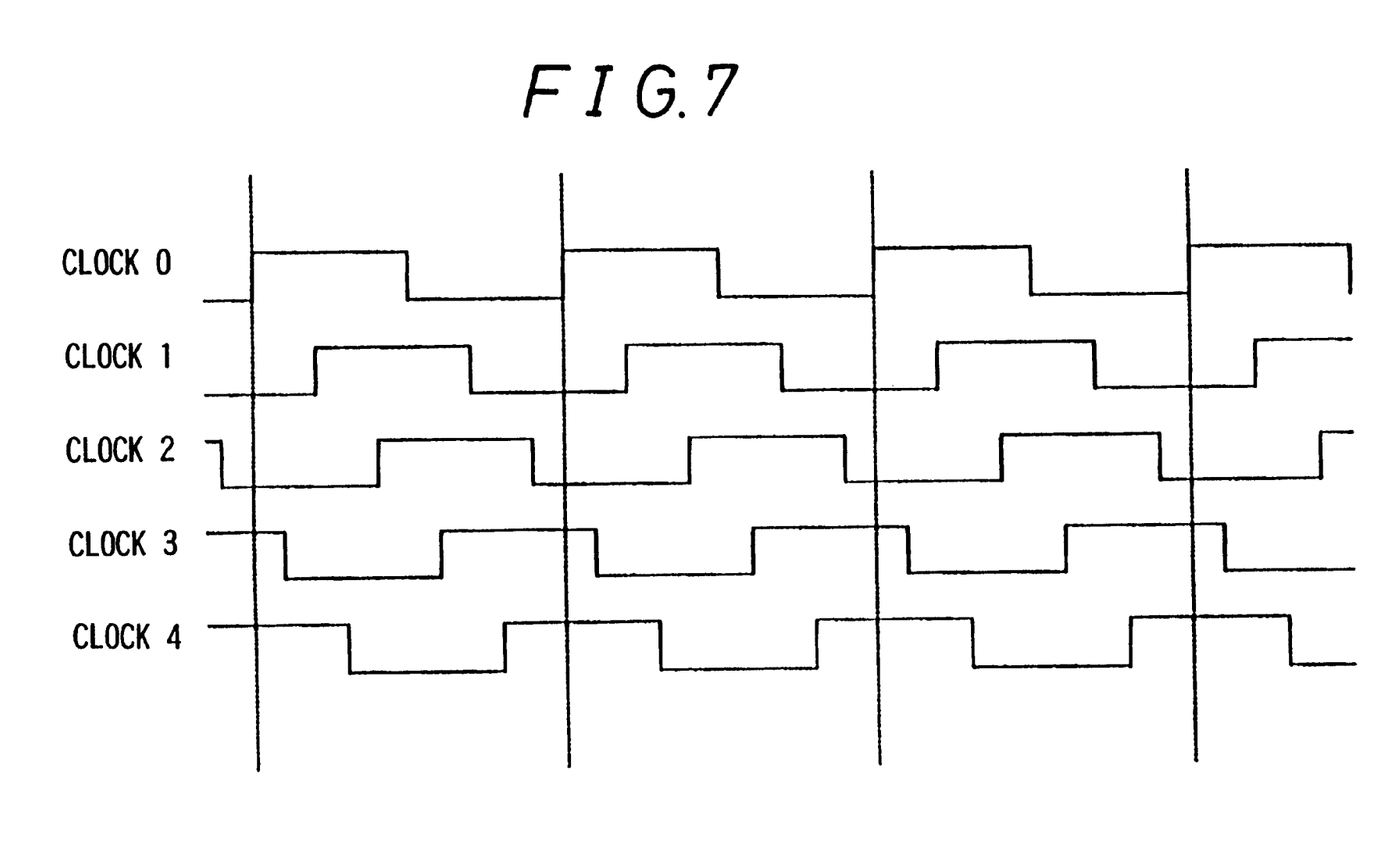
FIG. 7 is a diagram showing a clock waveform of a polyphase clock inputted to the bit synchronizing circuit shown in FIG. 6.
Figure 8:
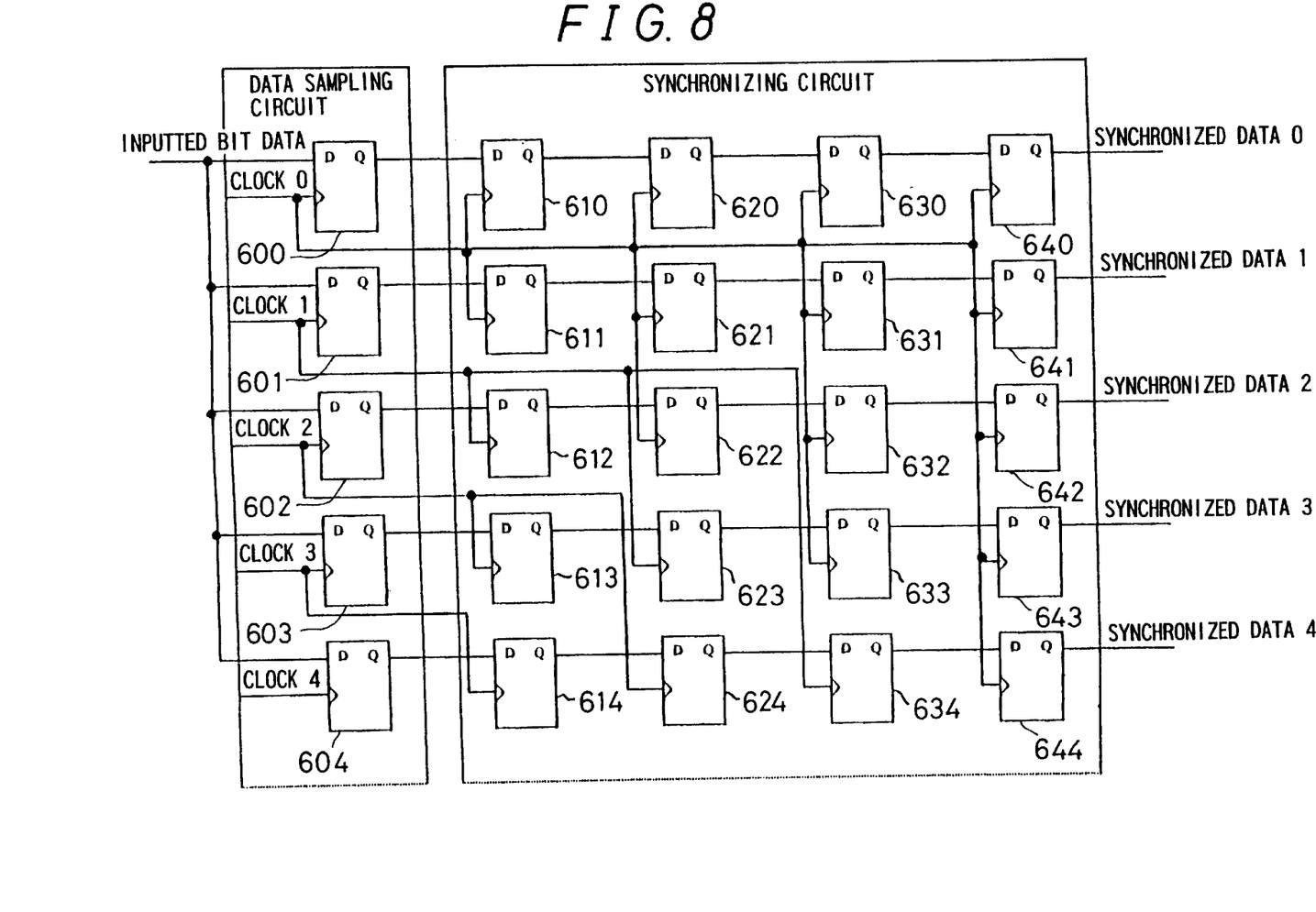
FIG. 8 is a block diagram showing a schematic configuration of a data sampling circuit and synchronizing circuit in the bit sampling circuit shown in FIG. 6.

A bit synchronizing circuit according to the mode is a bit synchronizing circuit operating by the five phase clock from clock 0 to clock 4 as shown in FIG. 7, of which the data sampling circuit is represented as D flip-flops 600 to 604 in FIG. 8. Those pieces of sampled data are synchronized by the D flip-flops 610 to 644. More concretely, for example, the D flip-flop 604 operates by clock 4 and the D flip-flop 614, of which the input is the output of that D flip-flop 604, operates by the clock 3 and the clocks are gradually changed so that the D flip-flops 640 to 644 all operate by clock 0 at the final stage.

In this embodiment, although the clocks are gradually changed, in the case where an allowance is added to the setup time of the D flip-flops, D flip-flops at a midpoint (e.g., one or two of sets of D flip-flops 410 to 414; 420 to 424; and 430 to 434) may be eliminated, if necessary, to carry out faster synchronization.

By synchronizing in this way, the occurrence of metastability can be prevented by the next D flip-flop even in the case where metastability occurs, and design and simulation become easy because the operation of the change point detecting circuit can be designed as a synchronizing circuit based on the changes of all of the sampled data by the same clock.

Figure 9:
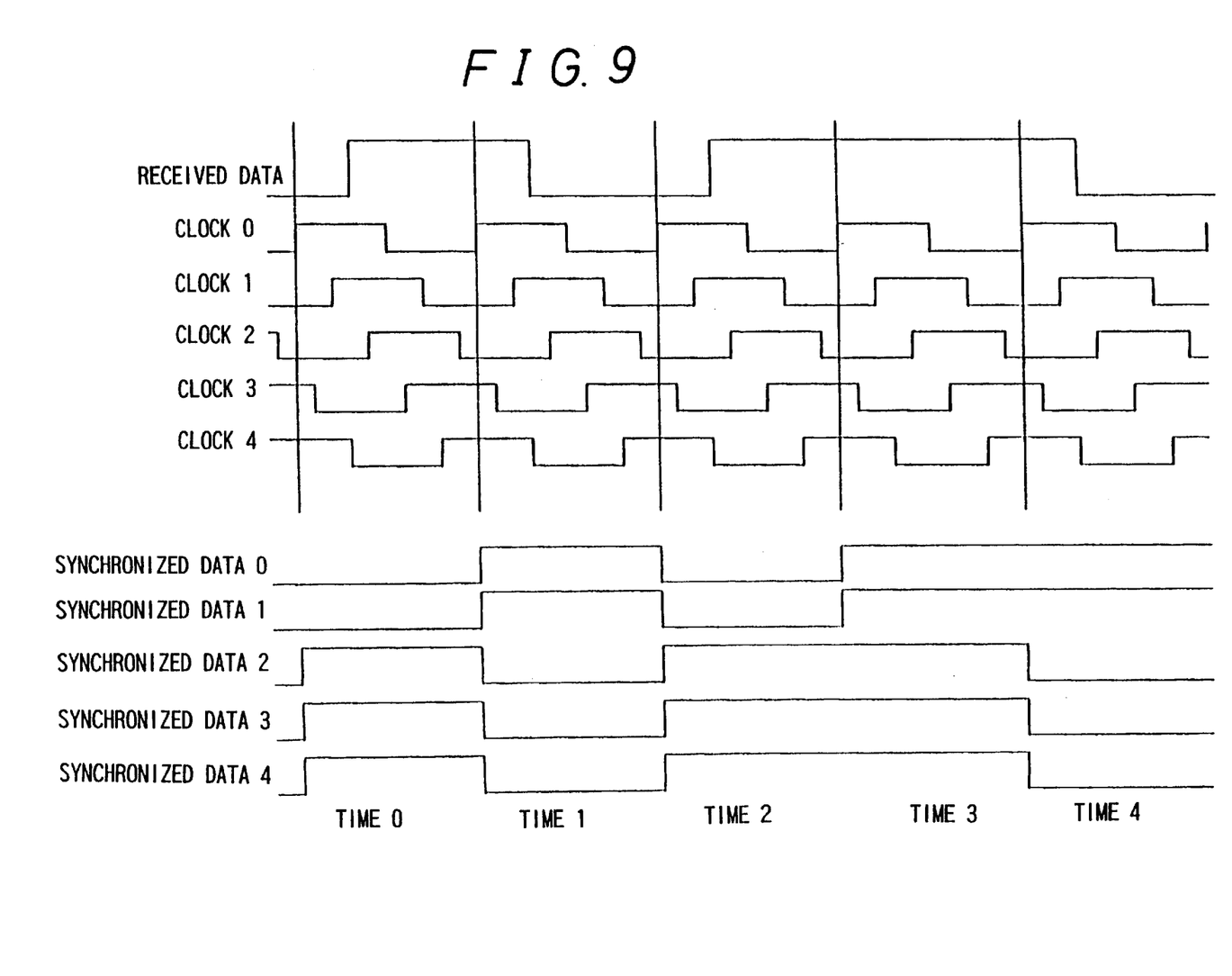
FIG. 9 is a diagram for describing the operation of the bit synchronizing circuit shown in FIG. 6.

By synchronizing in this way, when the bit data, which is the received data, as shown in, for example FIG. 9, is inputted, the bit data is over-sampled by clocks 0 to 4 to acquire synchronization data 0 to synchronization data 4 by synchronizing those signals. Here, in the case where the change point of the bit data is between the clock 1 and the clock 2, the synchronization data 2 to the synchronization data 4 which are gained by synchronizing the sample data over-sampled by clock 2 to clock 4 are the synchronization data in advance of the synchronization data 0 and the synchronization data 1, by one cycle of the bit rate 1. FIG. 9 is a diagram for describing the operation of the change point detecting circuit from the output of the synchronizing circuit and the operations of the data selecting circuit and synchronous FIFO writing circuit.

Here, by checking where the synchronized data is advanced, the place where the data gained by over-sampling the bit data has been changed can be detected.

As for a method of detection, for example, in the case where the rising of the bit data is detected, means for finding the place that is changed can be adapted by checking the synchronization data in sequence such as whether the synchronization data 2 is 0 and the synchronization data 1 is 1 or whether the synchronization data 1 is 0 and the synchronization data 2 is 1. According to this method, in the case where the change point of the bit data exists between clock 4 and clock 0, since all of the synchronizing data become the same, there is no detection of change point. In this case, by checking whether the equivalent data to the synchronizing data 4 delayed by one cycle of the bit rate is 0 and whether the synchronizing data 0 is 1, the change point between all the clocks can be detected without fail.

As for another method, by checking the part of the time 0 and the part of the time 1 between the synchronizing data 0 and the synchronizing data 4 in the case where the part of the time 0 and the part of the time 1 of the synchronizing data, for example, are changed when checking those two pieces of data, the change point is detected. By doing this in the case when the bit data change the clock, by which the data is over-sampled so as to generate the change point, can be detected.

The change point detecting circuit is rendered to change the output of the data detected in the above described manner only when the bit data change. By doing so the circuit can be prevented from malfunctioning by the outputted data after being calculated by the change point detecting circuit when the bit data does not change.

The data selector 503 selects and outputs a signal of the synchronizing data 4 gained by synchronizing the data of clock 4 which are shifted by approximately half of the bit rate in the case where there exists the change point of the bit data between the clock 1 and the clock 2, for example, as shown in FIG. 9. By doing so, sampled data sampled by the clock most remote from the change point of the bit data can be selected, therefore, recovery of accurate data becomes possible.

When this method is used, however, in the case where the selected data is changed to another type of synchronizing data, of which the waveform is shifted from that of the original data to either the front or to the back, such as from the synchronizing data 4 to the synchronizing data 0 or from the synchronizing data 0 to the synchronizing data 4, the data may be missing or overlapped, which results in inaccurate data.

Thereby, in the synchronization FIFO writing circuit 504, when the waveform is shifted to the back such as in the case when the synchronizing data 0 is selected from the situation where the synchronizing data 4 is selected, the data is outputted by condensing 1 cycle of the bit data and then the overlapped parts are removed, or when the waveform is shifted to the front such as in the case in which the synchronizing data 4 is selected from the condition where the synchronizing data 0 is selected, one cycle of the bit rate of the synchronizing data which has been selected previously is inserted again into the data and the following synchronizing data is outputted to the rear so that the missing data is compensated for so as to be outputted to the synchronous FIFO 505.

Since the synchronous FIFO writing circuit 504 operates in the same way as the synchronous FIFO without a read request, in the case where no read request is required the synchronous FIFO 505 is not particularly necessary, therefore, the output of the synchronous FIFO writing circuit 504 becomes the synchronized received data without change.

As described above, according to the mode, all of the parts, except the data sampling circuit 500 and the synchronizing circuit 501, can be operated with the same clock, therefore, a bit synchronizing circuit where simulation or design become very easy can be implemented.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and the range of equivalency of the claims are therefore intended to be embraced therein.

What is claimed is:

1. A bit synchronizing circuit for use in a reception circuit in serial communication, comprising:
   a data sampling circuit for over-sampling bit data at a sampling rate faster than a bit rate and outputting in parallel sampled bit data at a slower rate than the sampling rate;
   a change point detecting circuit for detecting rising and falling edges of the bit data based on the bit data outputted in parallel from the data sampling circuit;
   a selected value setting circuit for determining based on a change point outputted from the change point detecting circuit, which piece of the data of the data sampling circuit to be selected; and
   a data selecting circuit, in response to an output from the selected value setting circuit, for carrying out selection of the bit data from the data sampling circuit,
   the bit synchronizing circuit further comprising:
   a change point holding circuit for holding the change point outputted from the change point detecting circuit, and changing the held change point stepwise, data outputted from the change point holding circuit being inputted to the selected value setting circuit.

2. The bit synchronizing circuit of claim 1, further comprising:
   a deviation computing circuit for performing a computation of outputs from the change point holding circuit and the change point detecting circuit to determine whether the outputs are advanced or delayed as compared with a change point of inputted bit data.

3. The bit synchronizing circuit of claim 2, wherein the data of the change point holding circuit is changed based on an output of the deviation computing circuit.

4. The bit synchronizing circuit of claim 2, the bit synchronizing circuit further comprising:
   a counter for counting based on an output from the deviation computing circuit; and
   a comparison circuit for comparing a counter value with predetermined upper and lower limit values.

5. The bit synchronizing circuit of claim 4, wherein in the case where a comparison result of the comparison circuit indicates that a counter value is equal to or more than the predetermined upper limit value, or equal to or less than the predetermined lower limit value, the change point holding circuit changes an value thereof based on the comparison result.

6. The bit synchronizing circuit of claim 5, wherein the upper limit value and the lower limit value of the comparison circuit are variable.

7. The bit synchronizing circuit of claim 1, wherein in the case where a signal is inputted after no signal condition continues for more than a certain period of time, the change point holding circuit holds a change point of the change point detecting circuit as it is.

8. A bit synchronizing circuit for use in a reception circuit in serial communication, comprising:
   a data sampling circuit for over-sampling bit data at a sampling rate faster than a bit rate and outputting in parallel sampled bit data at a slower rate than the sampling rate;
   a change point detecting circuit for detecting rising and falling edges of the bit data based on the bit data outputted in parallel from the data sampling circuit;
   a selected value setting circuit for determining based on a change point outputted from the change point detecting circuit, which piece of the data of the data sampling circuit to be selected; and
   a data selecting circuit, in response to an output from the selected value setting circuit, for carrying out selection of the bit data from the data sampling circuit,
   the bit synchronizing circuit further comprising:
   a synchronizing circuit for synchronizing the bit data outputted in parallel from the data sampling circuit by shifting timing stepwise using a multistage D flip-flop so as to eliminate a phase difference between the sampled bit data, the data outputted from the synchronizing circuit being inputted to the data selecting circuit.

9. The bit synchronizing circuit of claim 1, comprising:
   a synchronizing circuit for synchronizing the bit data outputted in parallel from the data sampling circuit by shifting timing stepwise using a multistage D flip-flop, data outputted from the synchronizing circuit being inputted to the data selecting circuit.

10. The bit synchronizing circuit of claim 9, further comprising:
    a change point delay circuit for delaying the data outputted from the change point detecting circuit or change point holding circuit by a cycle of time for synchronizing in the synchronizing circuit.

11. The bit synchronizing circuit of claim 8 or 9, further comprising:
    a selected value delay circuit for delaying the data outputted from the selected value setting circuit by a cycle of time for synchronizing in the synchronizing circuit.

12. The bit synchronizing circuit of claim 1 or 8, comprising:
    a synchronous FIFO to which data outputted from the data selecting circuit is inputted.

13. The bit synchronizing circuit of claim 12, further comprising:
    a synchronous FIFO writing circuit having writing means for compensating an excess or shortage of data in the case where a shift in bit rate occurs between a clock of the bit data and a clock of a receiving end to be written into the synchronous FIFO.

14. The bit synchronizing circuit of claim 1 or 8, wherein in the data sampling circuit the bit data is over-sampled by a plurality of clocks of which phases are shifted with almost equal intervals and of which speed is the same as or slower than the bit rate.

15. A bit synchronizing circuit for use in a reception circuit in serial communication, comprising:
    a data sampling circuit for over-sampling bit data at a sampling rate faster than a bit rate and outputting in parallel a plurality of pieces of sampled bit data at a slower rate than the sampling rate;
    a synchronizing circuit for synchronizing the plurality of pieces of sampled bit data outputted in parallel from the data sampling circuit by changing timing gradually so as to eliminate a phase difference therebetween using a multistage D flip-flop; and
    a change point detecting circuit for detecting rising and falling edges of the sampled bit data based on data outputted from the synchronizing circuit.

16. The bit synchronizing circuit of claim 15, wherein in the data sampling circuit the bit data is over-sampled by a plurality of clocks of which phases are shifted with almost equal intervals and of which speed is the same as or slower than the bit rate.

17. The bit synchronizing circuit of claim 15, wherein the change point detecting circuit has a detecting method in which the data outputted from the synchronizing circuit is checked in order of from clock 1 to clock n on the assumption that in over-sampling bit data in the data sampling circuit, the bit data is over-sampled by phase-shifted clocks 1, 2, . . . , n−1, n, n+1, . . . , m−1, m (m, n: integer) in this order, and sampling of one cycle of bit rate is performed in data sampled by clocks 1 to n, and a change point of the over-sampled data is detected based on a change point of received data.

18. The bit synchronizing circuit of claim 7, wherein in checking the data outputted from the synchronizing circuit, data sampled by clocks 1 to n as well as data sampled by clocks which are phase-shifted from the clocks 1 to n by one cycle of bit rate is checked.

19. The bit synchronizing circuit of claim 15, wherein the change point detecting circuit has a detecting method in which a change point of bit data is detected by checking data sampled by clocks 1 to n as well as data sampled by clocks which are phase-shifted from the clocks 1 to n by one cycle of bit rate is checked in order of from clock 1 to clock n on the assumption that in over-sampling bit data in the data sampling circuit, the bit data is over-sampled by phase-shifted clocks 1, 2, . . . , n−1, n, n+1, . . . , m−1, m (m, n: integer) in this order, and sampling of one cycle of bit rate is performed in data sampled by clocks 1 to n, and a change point of the over-sampled data is detected by checking data sampled by the clocks 1 to n.

20. The bit synchronizing circuit of claim 15, wherein data outputted from the change point detecting circuit is changed only when the change point is detected.

21. The bit synchronizing circuit of claim 15, further comprising:

a data selecting circuit for selecting sampled data outputted from the output of the synchronizing circuit.

22. The bit synchronizing circuit of claim 21, wherein the data selecting circuit selects sampled data from the synchronizing circuit which is shifted by approximately half of the bit rate from the change point detected by the change point detecting circuit.

23. The bit synchronizing circuit of claim 21, further comprising:

a synchronous FIFO to which data outputted from the data selecting circuit is inputted.

24. The bit synchronizing circuit of claim 23, further comprising:

a synchronous FIFO writing circuit having writing means for compensating an excess or shortage of data in the case when a clock of the bit synchronizing circuit and a clock of the bit data are shifted.

* * * * *